(12) United States Patent
Leon et al.

(10) Patent No.: US 7,844,727 B2
(45) Date of Patent: Nov. 30, 2010

(54) METHOD AND DEVICE FOR PROACTIVE RATE ADAPTATION SIGNALING

(75) Inventors: David Leon, Irving, TX (US); Viktor Varsa, Irving, TX (US); Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 10/826,687

(22) Filed: Apr. 16, 2004

(65) Prior Publication Data

US 2004/0267956 A1 Dec. 30, 2004

Related U.S. Application Data

(60) Provisional application No. 60/465,120, filed on Apr. 24, 2003.

(51) Int. Cl.
*G06F 15/16* (2006.01)
(52) U.S. Cl. ............... 709/233; 370/235; 370/229; 709/231; 709/232
(58) Field of Classification Search ........... 370/465, 370/464, 229–235; 709/228, 230–233, 203
See application file for complete search history.

(56) References Cited

U.S. PATENT DOCUMENTS

| | | | | |
|---|---|---|---|---|
| 5,565,924 A | | 10/1996 | Haskell et al. | 348/423 |
| 5,903,673 A | * | 5/1999 | Wang et al. | 382/236 |
| 5,999,226 A | * | 12/1999 | Choi | 348/564 |
| 6,175,856 B1 | * | 1/2001 | Riddle | 709/204 |
| 6,292,834 B1 | * | 9/2001 | Ravi et al. | 709/233 |
| 6,643,259 B1 | | 11/2003 | Borella et al. | 370/231 |
| 7,016,970 B2 | * | 3/2006 | Harumoto et al. | 709/233 |
| 7,130,937 B2 | | 10/2006 | Hwang et al. | 710/57 |
| 2003/0097460 A1 | * | 5/2003 | Higashiyama et al. | 709/232 |
| 2004/0010614 A1 | * | 1/2004 | Mukherjee et al. | 709/231 |
| 2004/0098748 A1 | * | 5/2004 | Bo et al. | 725/105 |
| 2005/0172028 A1 | * | 8/2005 | Nilsson et al. | 709/231 |

FOREIGN PATENT DOCUMENTS

| | | |
|---|---|---|
| EP | 0847171 | 6/1998 |
| JP | 11177623 | 7/1999 |
| WO | WO01/37571 | 5/2001 |
| WO | WO 02/51155 A1 | 6/2002 |

* cited by examiner

*Primary Examiner*—Salad Abdullahi
(74) *Attorney, Agent, or Firm*—Ware, fressola, Van Der Sluys & Adolphson, LLP

(57) ABSTRACT

A method and system for adaptively controlling level of a receiver buffer in a client in a multimedia streaming network. The multimedia streaming network has a server for providing streaming data to the client. The server is responsible for adapting the transmission rate to the reception rate or congestion control, and for adapting the sampling rate to the transmission rate. Thus, the server manages the shift and keeps it within the rate adaptation operating range. The client is responsible for compensating for the packet transfer delay variation, which is also known as network jitter. The client is also responsible for setting parameters of the server rate adaptation operating range. The client chooses and sends the shift parameters to the server, but it is up to the server to adapt its encoding rate or transmission rate when responding to the parameters.

33 Claims, 3 Drawing Sheets

METHOD AND DEVICE FOR PROACTIVE RATE ADAPTATION SIGNALING

The present invention is based on and claims priority to U.S. Provisional Application No. 60/465,120, filed Apr. 24, 2003.

CROSS REFERENCES TO RELATED PATENT APPLICATIONS

This patent application is related to U.S. patent application Ser. Nos. 10/778,899 "Rate adaptation method and device in multimedia streaming, 10/779,318 "Method for signaling streaming quality adaptation and control mechanisms in multimedia streaming", and 10/778,941 "Method for signaling client rate capacity", all filed on Feb. 13, 2004, and assigned to the assignee of the present patent application.

FIELD OF THE INVENTION

The present invention relates generally to multimedia streaming and, more particularly, to rate adaptation between a server and a client in multimedia streaming services.

BACKGROUND OF THE INVENTION

In a multimedia streaming service, there are three participants involved: a streaming server, a streaming client and a transmission channel or an underlying network. Usually it is the transmission channel that is the bottleneck of the service, both in terms of throughput and in terms of reliability (i.e., if no throughput bitrate guarantee is assumed), but throughput limitations can occur also at the client and/or at the server.

In a real-time streaming system, due to the dynamically changing throughput characteristics of the channel, client and server, the streaming delivery needs to be adaptive in order to maintain a real-time playback experience for the user. The server should adapt the transmission rate to the varying throughput of the system. An example of such a rate adaptation system can be found in Haskell et al. (U.S. Pat. No. 5,565,924, "Encoder/Decoder Buffer Control for Variable Channel").

The streaming client provides receiver buffering for storing incoming data before passing them to the media decoder for playout. The receiver buffer is used to compensate for the difference between source encoding rate (also referred to as sampling rate) and transmission rate (pre-decoder buffering). It is also used to compensate for the packet transfer delay variation over the channel (jitter buffering). In general, these two functions are assumed to be combined in a single receiver buffer. However, they can also be implemented with two separate buffers in a receiver, although such an implementation is not optimum from a delay point of view. Receiver buffering can also smooth out the adaptation inaccuracies (i.e. if the system throughput is not matched exactly by the server output).

If the receiver buffer becomes empty (i.e. buffer underflow), which means that the decoder is running out of data to decode, the client needs to pause playout and re-buffer incoming data before resuming. On the other hand, if the incoming data rate is faster than the playout rate, then the receiver buffer space can be exhausted (i.e., buffer overflow), which can result in dropping packets from the buffer in order to make room for new incoming packets. When the packets are dropped, the video quality is degraded. To ensure a smooth and flawless playout, the receiver buffer of the client should be kept within a certain fullness range. In order to guarantee that the receiver buffer will not underflow or overflow, the bitrate for transmission and sampling at the server and that for reception and playout at the client must be adequately controlled.

In the following discussions, bitrate control will be described with reference to the bitrate evolution plots (on the horizontal axis, time in seconds; on the vertical axis, cumulative amount of data in bytes or bits) in which the following curves are defined:

The playout curve, P(t), shows the cumulative amount of data that the decoder has processed by a given time from the receiver buffer;

The sampling curve, S(t), shows the progress of data generation as if the media encoder was run real-time (it is the counterpart of the playout curve, and is actually a time-shifted version of it);

The transmission curve T(t), shows the cumulative amount of data sent out by the server at a given time; and The reception curve, R(t), shows the cumulative amount of data received and placed into the client buffer at a given time.

The difference between any two curves defines the delay and "buffer size" between those two curves. The bitrate control will be constrained by some limits on the difference between two curves (e.g., max buffer size, or max delay). A typical bitrate evolution plot is shown in FIG. 1.

When determining the best arrangement for server and client cooperation in the bitrate control, the following is to be considered:

A. Sampling curve—the control (i.e., selection of the bitstream for transmission) should be left completely to the server because:

1) it is only the server who knows about the exact characteristics of each bitstream, e.g., switching positions, priority of frames, future frame sizes, and 2) there might not be a bitstream rate that matches the network bit rate, and the server could perform some "tricks" (e.g., thinning, switching up-and-down).

B. Transmission curve—the control (i.e., the rate at which to transmit) also should be left to the server (i.e., using RTCP (Real Time Control Protocol) reports or other bandwidth info from the client) because:

1) in general, it is only the server who can measure the amount of data on-wire, and 2) there might be a need to adapt the transmission rate to the sampling curve if the sampling curve control has limited flexibility.

The server should maintain some real-time constraints by adapting its sampling curve S(t) to its transmission curve T(t). Adaptation of the sampling curve to the transmission curve guarantees that, with adequate buffering, the receiver is able to play out the media with correct synchronization. At every time instant t, the sampling curve S(t) should not deviate from the transmission curve T(t) by too large an amount of bytes.

If the server operates within a limit as defined by the real-time constraints, the client is responsible to provide any necessary buffering to follow the server within the limit. In that case, the client has to compensate for:

1) pre-decoder buffering for $|S(t)-T(t)|$, and 2) jitter buffering for transfer delay variation $\{T(t)-R(t)\}$.

In addition, the client must tolerate any mismatch between the playout curve and the sampling curve (e.g., clock drift or playback slowdown due to client platform operating system problem).

In a multimedia streaming system, a sender or server needs at each time instant to decide how to encode (at what rate) the following packet it will send and decide at what time to send it. In normal operations, the sender is able to maintain real-time playout by the receiver using only RTCP reports. The 3GPP (3rd Generation Partnership Project) Packet Switched Streaming Service (PSS) defines normative video buffering requirements, which are targeted to compensate for encoding and server-specific delay variations inherent in VBR (Variable Bit Rate) video compression and transmission (see 3GPP TS 26.234 V5.1.0, "Transparent End-to-End Packet Switched Streaming Service (PSS); Protocols and Codecs (Release 5)", June 2002, hereafter referred to as TS 26.234). When both streaming server and client comply with the buffering requirements, it is guaranteed that the client is able to play out the stream transmitted by the server without client buffer violation (i.e. there will be no buffer underflow or overflow at the client) provided that the stream from the server is transmitted over a constant-delay, reliable transmission channel. However, this is no longer possible under some circumstances such as handovers, retransmissions or clock drift. As a result, the sender and the receiver may take actions conflicting with each other, and a severe degradation in the user experience may occur.

In prior art, a receiver modifies its buffer level by the use of RTSP (Real Time Streaming Protocol) header fields speed (sub-sampling audio and or video) and scale (multiplicative increase or decrease of the bitrate). These headers are defined in IETF RFC2326. The receiver may also make use of bitrate switching commands by the client, as described in "End-to-End bit rate adaptation for PSS", 3GPP SA4 doc S4-030024.

SUMMARY OF THE INVENTION

The present invention divides the responsibilities of rate adaptation between the sender and the receiver as follows:
The server is responsible for:
Adaptation of the transmission rate to the reception rate (i.e. congestion control).
Adaptation of the sampling rate to the transmission rate (i.e. managing the shift and keeping it within the rate adaptation operating range).
The receiver is responsible for:
Compensating for packet transfer delay variation (i.e. network jitter).
Setting the parameters of the server rate adaptation operating range (i.e. range of shift).

The operating range for the server rate adaptation defines the limits of "dynamic scheduling of the server" by specifying the allowable minimum and maximum shift for any packet the server sends. The parameters of the server rate adaptation operating range are negotiated between the server and receiver so as to minimize the occurrences of underflow, overflow and quality degradation in such cases as handovers, retransmission and clock drift.

Thus, the first aspect of the present invention provides a method for adaptively controlling level of a receiver buffer in a client in a multimedia streaming network, the streaming network comprising a server for providing streaming data to the client, wherein the receiver buffer is used to compensate for difference between data transmission amount by the server and data usage amount by the client so as to allow the client to have sufficient amount of streaming data to play-out in a non-disruptive manner, said method comprising:
defining in the client at least one parameter for determining a rate adaptation operating range so as to carry out rate adaptation between the server and the client;
adapting in the server a data amount to a reception rate based on said at least one parameter; and
adjusting in the client packet transfer delay variation based on said adapting.

According to the present invention, the at least one parameter comprises a minimum shift amount indicative of a difference between a sampling time and a transmission time of a packet at the server so as to allow at the server to carry out said adapting based on the minimum shift amount.

According to the present invention, the at least one parameter comprises a target shift amount indicative of a shift amount greater than a difference between a sampling time and a transmission time of a packet at the server so as to allow at the server to carry out said adapting based on the target shift amount.

According to the present invention, the at least one parameter comprises a number specifying a maximum difference between the number of bytes that has been sent and the number of bytes that have been sampled so as to allow the server to carry out said adapting.

According to the present invention, said adapting in the server is carried out by adjusting the transmission rate or the sampling rate or both.

According to the present invention, the at least one parameter comprises a clock shift amount for preventing playout disruption in the client.

According to the present invention, the method further comprises the step of adapting a sampling rate to the transmission rate in the server based on said at least one parameter.

According to the present invention, two or more of the minimum shift amount, the target shift amount, the specifying number and the clock are sent together to the server.

The second aspect of the present invention provides a multimedia streaming system. The system comprises:
at least a client; and
a server for providing streaming data to the client, the client having a receiver buffer to compensate for a difference between data transmission amount by the server and data usage amount by the client so as to allow the client to have sufficient amount of streaming data to play-out in a non-disruptive manner, wherein the client comprises:
a mechanism for defining at least one parameter for determining a rate adaptation operating range so as to allow the server to adapt a data amount to a reception rate based on said at least one parameter; and
a mechanism to adjust a packet transfer delay variation based on said adapting.

According to the present invention, said at least one parameter may include a minimum shift amount indicative of a difference between a sampling time and a transmission time of a packet at the server so as to allow at the server to carry out said adaptation based on the minimum shift amount; a target shift amount indicative of a shift amount greater than a difference between a sampling time and a transmission time of a packet at the server so as to allow at the server to carry out said adaptation based on the target shift amount; a number specifying a maximum difference between the number of bytes that have been sent and the number of bytes that have been sampled, and a clock shift amount for preventing playout disruption in the client According to the present invention, the server comprises an adapting mechanism to adapt a sampling rate to the transmission rate based on said at least one parameter.

The third aspect of the present invention provides a software product for use in a client in a multimedia streaming network for adaptively controlling level of a receiver buffer in the client, the multimedia streaming network comprising a server capable for providing streaming data to the client, wherein the receiver buffer is used to compensate for difference between data transmission amount by the server and data usage amount by the client so as to allow the client to have sufficient amount of streaming data to play-out in a non-disruptive manner, said software product comprising:

a code for defining at least one parameter for determining a rate adaptation operating range in the server so as to carry out rate adaptation between the server and the client; and a code for adjusting a packet transfer delay variation based on said adapting.

According to the present invention, said at least one parameter may include a minimum shift amount indicative of a difference between a sampling time and a transmission time of a packet at the server; a target shift amount indicative of a shift amount greater than a difference between a sampling time and a transmission time of a packet at the server; a number specifying a maximum difference between the number of bytes that have been sent and the number of bytes that have been sampled; and a clock shift amount for preventing playout disruption in the client The fourth aspect of the present invention provides a terminal in a multimedia streaming network having at least a server for providing streaming data to the terminal, the terminal having a receiver buffer to compensate for difference between data transmission amount by the server and data usage amount by the terminal so as to allow the terminal to have sufficient amount of streaming data to play-out in a non-disruptive manner. The terminal comprises:

a mechanism for defining at least one parameter that determines a rate adaptation operating range in the server so as to allow the server to adapt the data transmission amount to a reception rate based on said at least one parameter; and a mechanism for adjusting a packet transfer delay variation based on said adapting.

According to the present invention, the defining mechanism comprises a software program having at least a code for defining said at least one parameter, and the adjusting mechanism comprises a software program having at least a code for adjusting the packet transfer delay variation.

The fifth aspect of the present invention provides a network element in the multimedia streaming network having a least a terminal that receives streaming data from the network element, the terminal having a receiver buffer to compensate for difference between data transmission amount by the network element and data usage amount by the terminal so as to allow the terminal to have sufficient amount of streaming data to play-out in a non-disruptive manner. The network element comprises:

means for receiving a request from the terminal, the request indicative of at least one parameter that determines a rate adaptation operating range in the network element; and a mechanism for adapting, based on said at least one parameter, the data transmission amount to a reception rate by the terminal, so as to allow the terminal to adjust a packet transfer delay variation based on said adapting.

According to the present invention, the adapting mechanism comprises a software program having at least a code for adapting the data transmission amount.

According to the present invention, the software program comprises a code for adjusting the transmission rate or the sample rate or both.

The present invention will become apparent upon reading the description taken in conjunction with FIGS. 1 to 3.

DETAILED DESCRIPTION OF THE INVENTION

Figure 1:
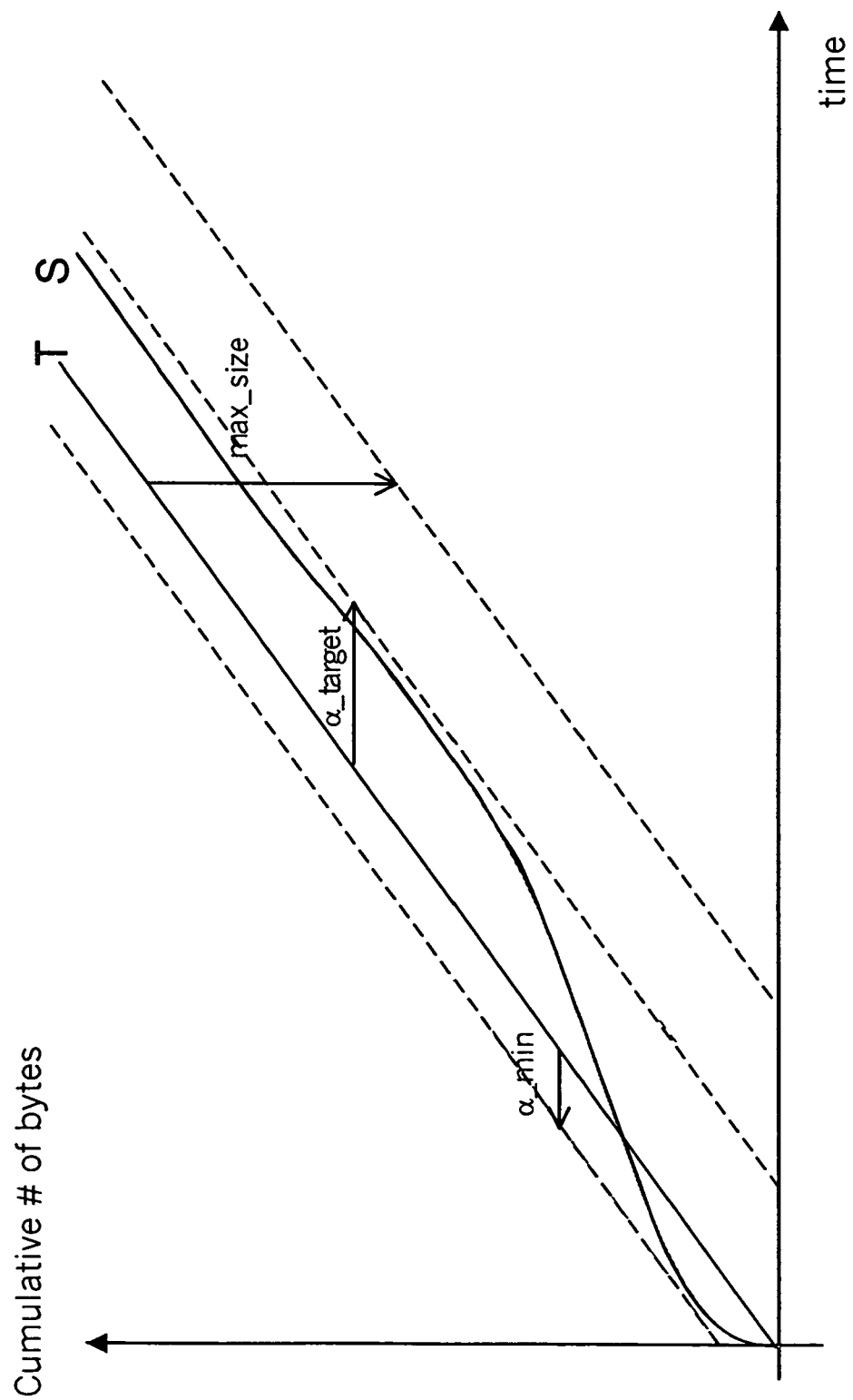
FIG. 1 is a plot defining parameters in relation with sampling and transmission curves.

In order to specify what the minimum and maximum shift is allowed for any packet the server sends, the present invention defines the "shift" using a rate adaptation model as follows.

A. Cooperative Rate Adaptation Model

The time difference $\alpha$ between the sampling time (i.e. timestamp) of the media in an RTP (Real-time Transport Protocol) packet and the transmission time of the packet (i.e. when it is sent by the server) is defined as the "shift". Referring to the sampling (S) and transmission (T) curves, a shift of $\alpha$ can be expressed as $T(t)=S(t+\alpha)$.

The shift is a positive value when the packet sampling time is later than the packet transmission time. The shift is a negative value when the packet sampling time is earlier than the packet transmission time.

With the definition of the "shift" being established, the minimum and maximum shift parameters are defined as follows.

B. Server Rate Adaptation Operating Range Parameters

The rate adaptation operating range parameters are defined as follows.

1) MINIMUM SHIFT—This parameter defines the smallest shift that the sender can use. It gives at transmission time t the oldest allowable sampling time that can be sent. If this parameter is $\alpha\_min$, the sender must be sending at time t a packet whose sampling time is no earlier than $t+\alpha\_min$.

Having this maximum limit on how late the packets can be sent compared to their sampling time, real-time playback can be maintained at the receiver. The receiver can estimate the maximum amount of time it has to allow waiting for packets to avoid delaying playback (i.e. no receiver buffer underflow).

The initial receiver buffering delay (i.e. pre-roll) has to be dimensioned to allow for the minimum shift and in addition to compensate for packet transfer delay variation. As an example, let us assume that the minimum shift is −2000 ms. This means that when the sender sends a packet, the packet sampling time can be maximum 2 seconds earlier compared to its transmission time, but not more. In order to avoid receiver buffer underflow, the receiver would buffer initially for the maximum expected packet transfer delay variation plus 2 seconds. The smaller the (negative) value, the higher the need for initial buffering at the receiver.

When the receiver detects clock drift (i.e. deviation of the receiver playout curve from the sampling curve maintained at the sender), the minimum shift parameter can be modified to force the server to follow the playout curve with the packet transmission times. For example, if the receiver is faster, it would play data at a faster rate than they are sampled. This would ultimately lead to buffer underflow. By requesting the sender to increase its minimum shift, the underflow can be avoided.

If the receiver is slower than the sender, the minimal shift should be decreased. If the receiver is faster than the sender, it should be increased.

The initial value of the minimal shift would typically be negative, but the receiver can modify it to become positive as well. For example, in case of faster receiver (i.e. faster playout clock) as the minimum shift increases, it may eventually become positive. For example, if the initial value is −2 seconds, the sender may later request the shift to be −1.9 seconds, then −1.7 seconds, etc.

2) TARGET SHIFT—This parameter defines the shift that the client would like the sender to achieve. If this parameter is $\alpha\_target$, the sender should be sending at time t a packet whose sampling time is t+$\alpha\_target$.

The target shift must always be higher than the minimum shift defined above. By definition, if the sender sends a packet according to the target shift, it also obviously complies with the minimum shift.

The target shift is meant to reduce the need for decreasing the sampling rate when the transmission rate has to be decreased abruptly (e.g. during a handover) while still meeting the real-time deadlines (i.e. minimum shift). In other words, the target shift is meant to have the sender send packets earlier than strictly necessary to meet real-time, when the transmission rate is good enough.

In order to better explain the use of this second parameter, let us assume that the sender operates close to the minimum shift. Let us now assume that the transmission rate significantly decreases (this could be because of e.g. handovers or RTP retransmissions that would decrease the bitrate available for the original stream). In order to guarantee the minimum shift (and thus real-time), the sender would also have to decrease sharply its sampling rate. This would cause a decrease in quality as the sender may, for example, be forced to skip frames in order to achieve the decrease in the sampling rate.

In case the server operates close to the target shift, when the transmission rate decreases the decrease in sampling rate does not need to be as sharp as the decrease in transmission rate. The sender dropping the transmission rate without dropping the sampling rate will decrease the actual shift below the target shift, but the minimum shift can still be maintained without having to reduce the sampling rate as drastically as the observed decrease in transmission rate.

After having been forced to reduce its shift, the server should rebuild its target shift when the transmission rate increases again. In order to achieve the target shift signaled by the receiver, the sender can use a combination of transmission rate increase and sampling rate decrease (or transmission rate decrease and sampling rate increase) depending on the current transmission rate constraints.

Having the target shift defined like this eliminates the need for the receiver to "command" the server to first decrease and then increase the shift back again when dealing with a drastic transmission rate decrease. The sender itself decides to decrease the shift from, but then again increases the shift back toward, the target shift that had been previously signaled by the receiver.

For this reason, this scheme can be said as proactive. No (shift) signaling needs to take place at the time the transmission rate decreases.

3) MAXIMUM NUMBER OF SEND-AHEAD BYTES— This parameter defines the maximum difference between the number of bytes that have been sent at time t and the number of bytes that have been sampled up to sampling time t (i.e. the difference between the transmission curve and sampling curve: $T(t)-S(t)$). This parameter limits the necessary buffer size at the receiver to hold the packets that were received as a result of a positive shift and for which the receiver must thus wait for their playout time. The goal of this parameter is to prevent buffer overflow.

These parameters are illustrated in FIG. 1 with an example of a transmission curve $T(t)$ and a sampling curve $S(t)$.

C. Server Compliance Requirements to Rate Adaptation Operating Range Parameters

The "minimum shift" and the "maximum number of send-ahead bytes" parameters must be strictly complied to by the server. Thus, the server will attempt to operate under normal transmission conditions as close to the "target shift" as its capabilities and the available media encoding allows.

Due to possible media encoding rate variation over time the "target shift" cannot be exactly followed by the server for all sent packets. Deviation from the "target shift" is allowed at the discretion of the server under transmission conditions where it would judge that strict adherence to the "target shift" would result in unnecessary quality degradation (see use case examples below). It is also up to server decision/capabilities how fast the "target shift" is recovered after such deviation.

Whenever the "target shift" and "maximum number of send-ahead bytes" parameters conflict (i.e. maintaining the target shift would result in exceeding the maximum number of send-ahead bytes), the latter takes precedence.

D. Clarification of Responsibility Split Between Server and Client

The key to maintaining uninterrupted playout is the efficient management of the receiver buffer level. This can be accomplished by having at least implicit or estimated control over both the playout curve and the reception curve at the client. The client by definition knows and controls the decoding/playout timeline. By enabling control of the shift to be introduced by the sender, the client is given at least estimated control of the receiver curve and its relation to the sampling curve, thus given the control of the receiver buffer level.

Accordingly, the client chooses and requests the shift parameters considering its absolute buffering limitations. In this co-operative rate adaptation model, the receiver requests only the shift parameters and it is up to the sender how to adapt its encoding rate and/or transmission rate when responding to the request. Either the transmission curve or the sampling curve or a combination of both can be adapted.

However, sampling rate control (i.e. selection of the bitstream for transmission) is left under server control because:

It is only the server which knows about the exact characteristics of each bitstream, e.g. switching positions, priority of frames, future frame sizes.

There might not be a bitstream rate that matches the network bit rate, so the server could do some "tricks" (e.g. thinning, switching up-and-down) in order to fit the bitstream rate to the network bit rate.

Transmission rate control (i.e. the rate at which to transmit) is also left to server control (i.e. using RTCP RR reports) because:

In the general case it is only the server who can measure the amount of data on-the-way.

There might be a need to couple the transmission rate to the sampling rate if the sampling rate control has limited flexibility.

The sender is limited when trying to perform the adaptation by:

Modification of the transmission curve: the transmission curve is constrained by the reception curve and thus the sender may not be able to increase it. It can increase it only if it were not using previously its total available bandwidth. For example, a server may be using the TFRC (Transmission Control Protocol Friendly Rate Control) mechanism (or receiving an explicit bandwidth information via receiver signaling) to compute its allowable transmission rate and would not increase its rate above the rate TFRC (or the actual signaled bandwidth) tolerates.

Modification of the sampling curve: depends on the rate adaptation capability of the sender. For example if the sender implements bitstream switching and if the sender is transmitting at its lowest (or highest) bitstream, it would not be able to further decrease (or decrease) the sampling rate.

E. Use Cases

According to the present invention, the parameters of the server rate adaptation operating range are negotiated between the server and receiver so as to minimize the occurrences of underflow, overflow and quality degradation in such cases as handovers, retransmission and clock drift.

In the case of RTP packet transmission, the receiver is able to choose the number of packet retransmissions it wants to perform and the delay it will tolerate for retransmission.

In the case of handovers, the receiver may derive, from the radio network type, for example, the handover length it expects and thus the required target shift. The receiver knows better about the radio link and may also detect inter-system handover and the need to adapt the clock shift parameters accordingly.

The receiver may compensate for the clock drift with the sender, by updating the clock shift parameters.

RTP Retransmission

Before making a retransmission request, the receiver usually needs to estimate whether a retransmitted packet will make it before its playout time. If the packet does not make it, the retransmission wastes the available bandwidth.

The sender knows the sampling time of the packets that have to be scheduled with at least the shift $\alpha\_min$ in order to meet the real-time constraints at the receiver.

A retransmission packet is in this regard no different from a packet being sent for the first time. Since the minimum shift indicates the underflow threshold at the receiver, the sender should not retransmit a packet if its timestamp is less than $t+\alpha\_min$ where t is the current time.

The shift parameter signaling thus makes packet retransmission more efficient by allowing the sender not to retransmit packets that would not make it at the receiver before their decoding time and whose retransmission would waste the available bandwidth. The receiver does not need to be overly conservative in its estimation of whether a missing packet could be received before its playout. A wrong estimate will have no effect (besides the useless request) as if the server will not retransmit the packet.

The receiver is also able to trade-off the number of retransmissions it would like to perform through the target shift. The higher the value of the target shift, the more packets will be sent ahead (and the higher the receiver buffer level will be) while the network conditions are good. This in turn will give more time for retransmissions when the network conditions get worse.

Here again the clock shift is proactive. The receiver does not need to synchronize the shift request with the RTCP request.

Handovers

The clock shift signaling can be used as a tool to prevent playout disruption at the receiver because of handover.

Let us assume that the receiver is connected to a network and it knows that the expected handover length for this network is $T_H$. Let us assume the receiver sets its target shift to be at least higher by $T_H$ than the minimum shift, i.e. $\alpha\_target > \alpha\_min + T_H$.

Before the handover, the sender meets the target shift by sending the packets early. When the sender detects the handover, it should stop transmitting (and thus avoid packet loss because of network buffer overflow). During the handover, the clock advances while no new data are being sent. As a consequence, the handover reduces the shift by the amount of time $T_H$ (assuming that the handover lasted exactly $T_H$). Since the sender was operating at the target shift before the handover, the shift after the handover will be $\alpha\_target - T_H$.

This value is still more than the minimum shift $\alpha\_min$. This means that real time is still being met and there was no underflow at the receiver. During the handover, the receiver is able to play out the packets that were sent by the sender according to the target shift and without significant quality degradation.

After the handover, the sender will rebuild the target shift as its transmission rate increases again. No new signaling is needed.

The receiver would signal a new shift parameter only if it wants to increase its target shift in order to further increase the handover length it can tolerate. This could be the case in particular if there is a handover to a network of different type with different expected handover length.

The sender needs of course to be able to detect the handover. The sender would normally detect the handover by not receiving RTCP packet for several RTCP intervals. In order that the sender be able to detect the handover as soon as possible, the receiver should send an early feedback packet if AVPF is available. AVPF is an extended profile for RTCP based feedback.

If the receiver sends the parameters over RTSP, it could send a new request after the handover (with the same parameters or updated value). This would help the sender to detect that the handover is over more rapidly if fast RTCP feedback is not available.

Figure 2:
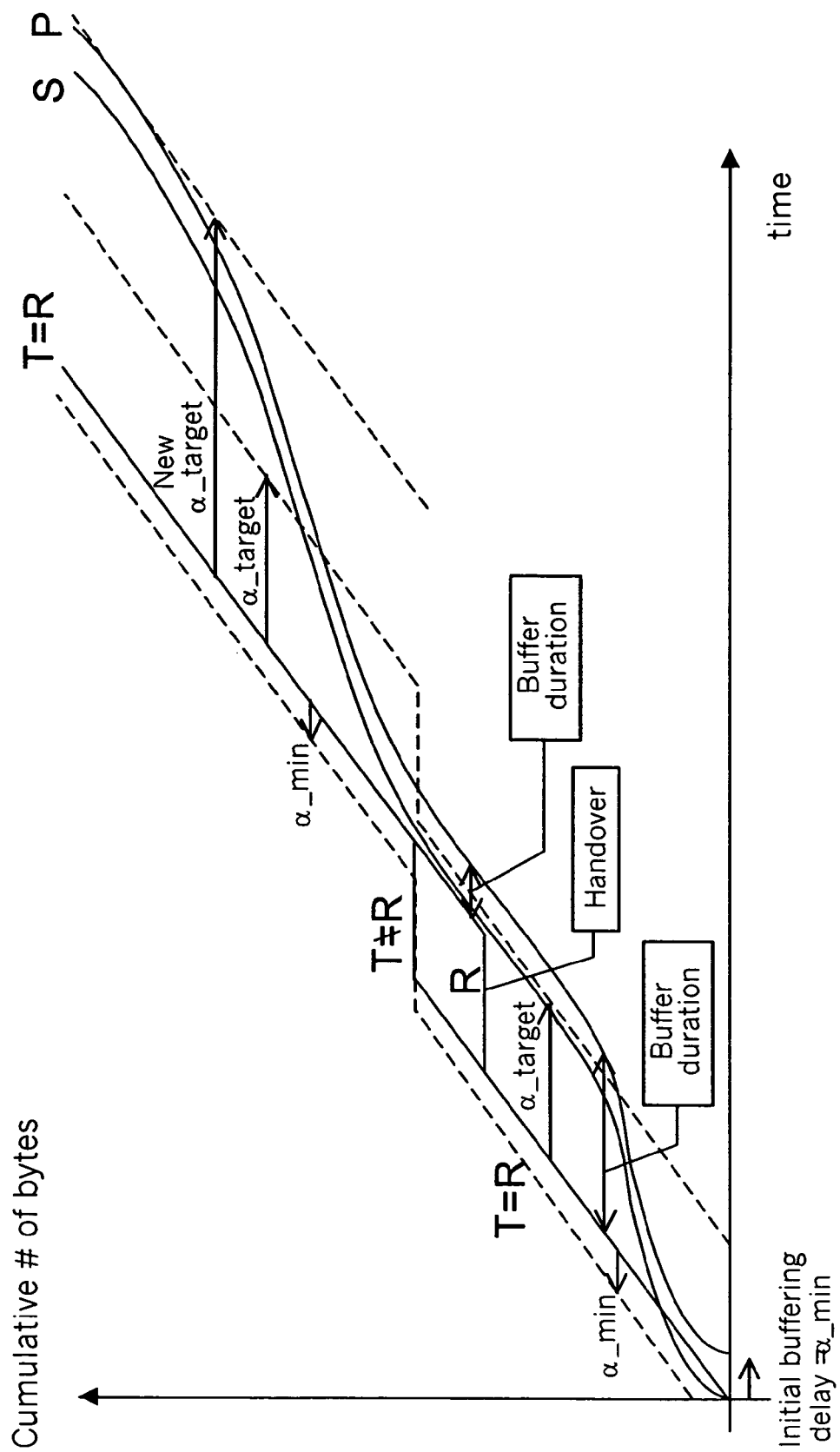
FIG. 2 is a plot illustrating a handover and its effect on the receiver buffer level for certain shift parameters.

The handover and its effect on the buffer level are illustrated in FIG. 2. In this example, during the handover, the buffer level decreased but did not underflow. After the handover, the sender will rebuild by itself the initial target $\alpha\_target$. However, since the buffer almost emptied during the handover, the receiver could choose to signal a larger value of the target once the handover is over. This may be because the first handover is larger than what the receiver initially expected and wants to make sure it can support larger handovers in the future. The signaling of the new target and its effect on the curves is shown in the figure.

Clock Drift

Because of the clock drift between the sender and the receiver or any other reasons (such as slow client platform operating system), the sender may look too slow or too fast to the receiver. The drift can be corrected by sending new shift parameters.

For example, in the case of a slow receiver, the receiver could periodically request a decrease in the minimum shift value.

F. Message Format and Transport

A new RTSP header can be defined as "3GPP-Shift-Parameters". This header can be used in client requests to signal the shift parameters requested by the client.

If the request applies to the session level RTSP URL (uniform resource locator), the shift should apply to all media in the session. If the request applies to a media level RTSP URL, the shift should apply only to this medium. The sender also uses the "3GPP-Shift-Parameters" in its response. The parameters can be the parameters requested by the client. However, the sender may return parameters that are only as close as possible to the requested parameters (because of limited sender capability).

This new header can be sent with any RTSP method.

The ABNF for this RTP header is shown below:

```
3gppshiftparameters = "3GPP-Shift-Parameters" ":"
shift-parameter *(";" shift-parameter) CRLF
shift-parameter = alpha-min / alpha-target / max-size
alpha-min = "alpha_min" "=" "+" / "−" 1*DIGIT ; ms
alpha-target = "alpha_target" "=" "+" / "−" 1*DIGIT ;
ms
max-size = "max_size" "=" 1*DIGIT; bytes
```

The first time the client sends all the parameters. In subsequent requests, the client may send only the parameter(s) it requests to change.

If the change is acceptable, the server does not need to send the header if all the parameters have been set as requested by the receiver.

If a new request is received by the server before the previous request is completed, the server should comply with the latest request.

The sender can also signal to the receiver at the beginning of the session the parameters the sender likes to use. The receiver takes these parameters into account when choosing which values of the parameters to request.

Although the preferred method to signal the parameters is with RTSP, an unreliable transport protocol such as RTCP could be used.

Figure 3:
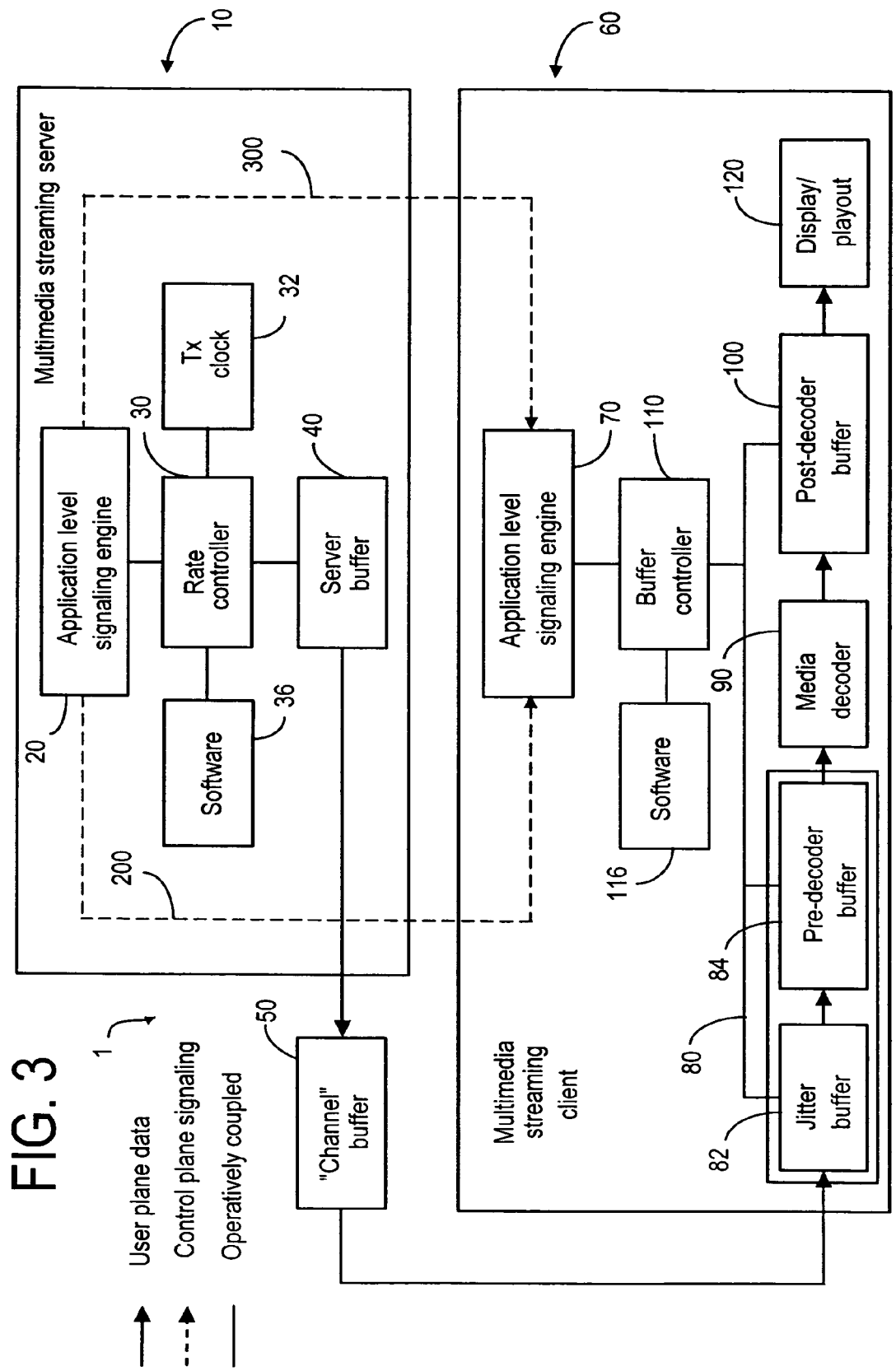
FIG. 3 is a block diagram showing a multimedia streaming system having a server device and a client device that can perform the rate adaptation method, according to the present invention.

FIG. 3 is a block diagram illustrating a multimedia streaming system 1 in a streaming network according to the present invention, in which means are provided for signaling parameters that determine the rate adaptation operating range for a network element or streaming server 10, as negotiated between a terminal or streaming client 60 to the streaming server 10.

The streaming server 10 comprises an application level signaling engine 20, a rate controller 30 and a server buffer 40. The streaming client 60 comprises an application level signaling engine 70, corresponding to, and adapted to communicate with, the application level signaling engine 20 in the streaming server 10. It further comprises a client buffer 80 which, in the embodiment of the invention illustrated in FIG. 3, comprises a jitter buffer 82 and a pre-decoding buffer 84, integrated as a single unit. In other embodiments of the invention, streaming client 60 may include a jitter buffer and a pre-decoding buffer that are implemented separately. The streaming client further comprises a media decoder 90, a post-decoder buffer 100, a buffer controller 110 and a display/play-out device 120.

The system depicted in FIG. 3 is further shown to comprise a "channel buffer" 50 located between streaming server 10 and streaming client 60, representing the varying transfer delay that occurs during transmission of data packets from the streaming server to the client.

At the streaming client 60, media data is received from the transmission channel and buffered in client buffer 80. The parameters of pre-decoder buffer 84 and jitter buffer 82 are set by the buffer controller 110. The parameters are chosen as an aggregate of the server recommended pre-decoder buffering parameters and the additional buffering required as estimated by the client. The client estimates what is needed to tolerate the expected packet transfer delay variation (i.e. jitter) on the available transmission channel. Such aggregate is constrained by the maximum buffering capabilities of the client. Media decoder 90 extracts media data from the client buffer and decodes the media data in a manner appropriate for the media type in question. It should be appreciated that the media data will, in general, comprise a number of different media types. For example, if the media data transmitted from the server is representative of a video sequence, it is likely to comprise at least an audio component in addition to video data. It should therefore be understood that media decoder 90, as illustrated in FIG. 3, may actually comprise more than one decoder, for example a video decoder implemented according to a particular video coding standard and an associated audio decoder. As the media data is decoded by media decoder 90, it is output to post-decoder buffer 100 where it is stored temporarily until its scheduled play-out time, at which point it is passed from the post-decoder buffer to display/play-out device 120 under the control of buffer controller 110.

According to the invention, buffer controller 110 is adapted to provide an indication of the minimum shift, the target shift and the maximum number of send-ahead bytes to the application level signaling engine 70. These parameters are determined by a software program 116, for example, based on the client's buffering limitations, the decoding/playout timeline, etc. The application level signaling engine is, in turn, adapted to transmit a signal 300 indicative of those operating range rate adaptation parameters to the streaming server 10. The parameters are transmitted from client to the server using the Real Time Streaming Protocol (RSTP), for example. The RSPT header can be defined as "3GPP-Shift-Parameters", for example.

At the server site, the server's rate controller 30 is operative to adapt the transmission rate to the reception rate, and to adapt the sampling rate to the transmission rate while managing the shift and keeping it within the rate adaptation range. The server also has a transmission clock 32 to timestamp the packets to be transmitted to the client. The server, using a software program 36, operates by adjusting the transmitted data rate in accordance with the parameters recommended by the client, varying bit-rate on the transmission channel, taking into account the client's recommended shift parameters, thereby seeking to avoid pauses in play-back at the client due to pre-decoder buffer underflow or dropping packets at the client due to buffer overflow.

Server buffer 40 stores data packets temporarily before they are transmitted from the streaming server across the transmission channel to streaming client 60. In a "live" streaming scenario where data packets are sampled real-time, the server buffer is indeed a physical buffer where data packets are placed at sampling time and are extracted at transmission time. In a "pre-encoded" streaming scenario, where data packets are not sampled real-time but are stored in a pre-encoded file and are read from the file at transmission time, the server buffer is a virtual buffer that represents the difference between sampling time (with reference to a sampling clock started at the streaming server when the first data packet of the pre-encoded file is transmitted) and transmission time of data packets.

The server can also use the application level signaling engine 20 to send to the receiver at the beginning of the session a signal 300 indicative of the parameters the server wants to use. Taking into consideration the parameters indicated by the signal 300, the receiver chooses the parameters of the server rate adaptation operation range. Based on the server capability, the server may use the signal 300 to respond to the client's request, returning the parameters that the server can use for rate adaptation.

ADVANTAGES OF THE PRESENT INVENTION

The prior art methods (RTSP headers and bitrate switching) have many limitations. One of the limitations is that the SPEED header can be sent only in an RTSP PLAY request.
- PLAY was not meant to be manipulated for buffer control, but rather to translate user requests from the client to the server.
- The response to a new PLAY with Range request can not be expected to be synchronized with the actual play position at the time the server gets the request (i.e. skipping or re-sending of data is possible).
- Modifying the transmission rate, as requested by the client through RTSP SPEED, may often not be possible at all as the transmission rate needs to be adapted to the available bitrate.
- It operates in the bitrate domain, which can not be directly mapped by the receiver to time domain (i.e. the amount of time it'll take for the receiver to play back a given amount of data). This is because the sampling curve is usually not a straight line.
- There might not be a bit stream rate that matches the NW bit rate.
- The client doesn't know how much of the receiver buffer level decrease/increase is due to variation of the bitrate within the given bitstream or due to accumulation of difference between the bitstream average rate and the transmission rate.
- Conflict between sampling curve shaping decisions are made at the sender and the receiver because there is no separation of the server and client tasks. This is to be contrasted with the clock shift signaling whereby there is a clear division of the sender and the receiver responsibilities. The receiver only modifies the constraints on the curves while the sender does the actual shaping of the curves in order to meet the constraints.

The present invention has the following advantages:
- The scheme is made to work in a more proactive manner. The idea is to allow the server to operate the rate control in a less restrictive and more flexible manner with the client requesting an operating range rather than a strict operating point.
- The requested server rate adaptation operating range is now clearly and unambiguously defined, simplifying a compliant server implementation.
- The signaling overhead of the scheme is reduced by decreasing the required frequency and speed (i.e. synchronous to RTP) of client to server signaling.
- The transport reliability and correct pipelining of client to server rate adaptation operating range request messages can be solved through the use of RTSP signaling. This is in line (i.e. not any more contradicting) with the relaxed requirement on speed and frequency of signaling.

In sum, the present invention provides a method and system for adaptively controlling level of a receiver buffer in a terminal or client in a multimedia streaming network. The multimedia streaming network has a network element or server for providing streaming data to the client. The server is responsible for adapting the transmission rate to the reception rate or congestion control, and for adapting the sampling rate to the transmission rate. Thus, the server manages the shift and keeps it within the rate adaptation operating range. The client is responsible for compensating for the packet transfer delay variation, which is also known as network jitter. The client is also responsible for setting parameters of the server rate adaptation operating range. The client chooses and sends the shift parameters to the server, but it is up to the server to adapt its encoding rate or transmission rate when responding to the parameters.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method comprising:
defining in a client in a multimedia streaming network at least one parameter for determining a rate adaptation operating range, wherein the streaming network comprises a server configured for providing streaming data to the client, the client having a receiver buffer for storing at least part of the streaming data to compensate for a difference between data transmission amount by the server and usage amount of the streaming data by the client so as to allow the client to have sufficient amount of streaming data to play out in a non-disruptive manner, and wherein the rate adaptation operating range is used for rate adaptation between the server and the client;
providing to the server information indicative of said at least one parameter;
adapting in the server the data amount to a reception rate at the client based on said at least one parameter; and
adjusting in the client packet transfer delay variation based on said adapting, wherein said at least one parameter comprises a shift amount in time indicative of a difference between a sampling time and a transmission time of a packet at the server.

2. A method according to claim 1, wherein said shift amount is equal to said difference so as to allow the server to carry out said adapting based on the shift amount.

3. A method according to claim 1, wherein said shift amount is greater than said difference so as to allow the server to carry out said adapting based on the shift amount.

4. A method according to claim 1, wherein said at least one parameter further comprises a number specifying a maximum difference between the number of bytes that has been sent and the number of bytes that have been sampled so as to allow the server to carry out said adapting based on the number.

5. A method according to claim 1, further comprising adapting a sampling rate to the transmission rate in the server based on said at least one parameter.

6. A method comprising:
defining in a client in a multimedia streaming network at least one parameter for determining a rate adaptation operating range, wherein the streaming network comprises a server configured for providing streaming data to the client, the client having a receiver buffer for storing at least part of the streaming data to compensate for a difference between data transmission amount by the server and usage amount of the streaming data by the client so as to allow the client to have sufficient amount of streaming data to play out in a non-disruptive manner, and wherein the rate adaptation operating range is used for rate adaptation between the server and the client;

providing to the server information indicative of said at least one parameter;

adapting in the server the data amount to a reception rate at the client based on said at least one parameter; and adjusting in the client packet transfer delay variation based on said adapting, wherein said at least one parameter comprises a shift amount in time indicative of a difference between a sampling time and a transmission time of a packet at the server.

7. A method according to claim 6, wherein said adapting comprises an adjustment of a transmission rate.

8. A method according to claim 6, wherein said adapting comprises an adjustment of both a transmission rate and a sampling rate.

9. A method according to claim 6, wherein said at least one parameter further comprises: a number specifying a maximum difference between the number of bytes that has been sent and the number of bytes that have been sampled; and a clock shift amount indicative of a clock drift between the client and the server.

10. A multimedia streaming network comprising:

at least a client; and a server for providing streaming data to the client, the client having a receiver buffer to compensate for a difference between data transmission amount by the server and data usage amount by the client so as to allow the client to have sufficient amount of streaming data to play-out in a non-disruptive manner, wherein the client comprises:

a mechanism for defining at least one parameter for determining a rate adaptation operating rang; and for providing information indicative of said at least one parameter to the server so as to allow the server to adapt the data amount to a reception rate at the client based on said at least one parameter; and a mechanism to adjust a packet transfer delay variation based on said adapting, wherein said at least one parameter comprises a shift amount in time indicative of a difference between a sampling time and a transmission time of a packet at the server.

11. A multimedia streaming network according to claim 10, wherein said shift amount is equal to said difference so as to allow at the server to carry out said adapting based on said shift amount.

12. A multimedia streaming network according to claim 10, wherein said shift amount is greater than said difference.

13. A multimedia streaming network according to claim 10, wherein said at least one parameter further comprises a number specifying a maximum difference between the number of bytes that has been sent and the number of bytes that have been sampled so as to allow the server to carry out said adapting.

14. A multimedia streaming network according to claim 10, wherein the server comprises an adapting mechanism for adapting a sampling rate to the transmission rate based on said at least one parameter.

15. A multimedia streaming network according to claim 10, wherein said at least one parameter further comprises a further shift amount indicative of a clock drift between the server and the client.

16. A multimedia streaming network according to claim 10, wherein the server comprises an adapting mechanism for adjusting a transmission rate.

17. A multimedia streaming network according to claim 10, wherein the server comprises an adapting mechanism for adjusting both a transmission rate and a sampling rate.

18. A multimedia streaming network according to claim 10, wherein the server comprises a software program having at least a programming code for carrying out said adapting.

19. A non-transitory computer readable storage medium embedded with a software program comprising:

programming code for defining in a client in a multimedia network at least one parameter for determining a rate adaptation operation range, wherein the streaming network comprises a server configured for providing streaming data to the client, the client having a receiver buffer for storing at least part of the streaming data to compensate for a difference between data transmission amount by the server and usage amount of the streaming data by the client so as to allow the client to have sufficient amount of streaming data to play out in a non-disruptive manner, where information indicative to said at least one parameter is provided to the server so as to allow the server to carry out rate adaptation between the server and the client based on said at least one parameter, wherein said one parameter comprises a shift amount in time indicative of a difference between a sampling time and a transmission of a packet at the server; and programming code for adjusting a packet transfer delay variation in the client for the rate adaptation.

20. A non-transitory computer readable storage medium according to claim 19, wherein said shift amount is equal to said difference so as to allow at the server to carry out said rate adaptation.

21. A non-transitory computer readable storage medium according to claim 19, wherein said shift amount is greater than said difference so as to allow the server to carry out said rate adaptation.

22. A non-transitory-computer readable storage medium according to claim 19, wherein said at least one parameter further comprises a number specifying a maximum difference between the number of bytes that have been sent and the number of bytes that have been sampled so as to allow the server to carry out said rate adaptation.

23. A non-transitory computer readable storage medium according to claim 19, wherein said at least one parameter further comprises a further shift amount indicative of a clock drift between the server and the client.

24. An apparatus comprising:

a buffer for storing at least part of streaming data provided by a server in a multimedia streaming network to compensate for a difference between data transmission amount by the server and the data usage amount in a client so that sufficient amount of the streaming data can be played out in a non-disruptive manner;

a mechanism for defining at least one parameter that determines a rate adaptation operating range in the server so as to allow the server to adapt the data transmission amount to a reception rate at the client based on said at least one parameter, wherein said one parameter comprises a shift amount in time indicative of a difference between a sampling time and a transmission time of a packet at the server; and a mechanism for adjusting a packet transfer delay variation based on said adapting.

25. An apparatus according to claim 24, wherein said defining mechanism comprises a software program having at least a programming code for defining said at least one parameter.

26. An apparatus according to claim 24, wherein said adjusting mechanism comprises a software program having at least a code for adjusting the packet transfer delay variation.

27. An apparatus according to claim 24, wherein said shift amount is equal to said difference so as to allow the server to carry out said adapting based on the shift amount.

28. An apparatus according to claim 24, wherein said shift amount is greater than said difference so as to allow the server to carry out said adapting based on the shift amount.

29. An apparatus according to claim 24, wherein said at least one parameter further comprises a number specifying a maximum difference between the number of bytes that have been sent and the number of bytes that have been sampled so as to allow the server to carry out said adapting based on the number.

30. A network element in the multimedia streaming network, said network element comprising:

a receiving module for receiving a request from a client have a buffer for storing at least part of streaming data provided by the network element to compensate for a difference between data transmission amount by the network element and data usage amount by the client so that the client has sufficient amount of streaming data to play out in a non-disruptive manner, the request indicative of at least one parameter that determines a rate adaptation operating range in the network element, wherein said one parameter comprises a shift amount in time indicative of a difference between a sampling time and a transmission time of a packet at the network element;

a server buffer for storing the streaming-data to be transmitted to the client; and a mechanism for adapting, based on said at least one parameter, the data transmission amount from the network element to a reception rate at the client, so as to allow the client to adjust a packet transfer delay variation based on said adapting.

31. A network element according to claim 30, wherein said adapting mechanism comprises a software program having at least a programming code for adapting the data transmission amount.

32. A network element according to claim 31, wherein the software program comprises a programming code for adjusting the transmission rate.

33. A network element according to claim 31, wherein the software program comprises a programming code for adjusting of both a transmission rate and a sampling rate.

* * * * *